Dec. 25, 1928.
H. I. SHIRE
ELECTRICAL INSTRUMENT
Original Filed Sept. 16, 1920    3 Sheets-Sheet 1
1,696,333
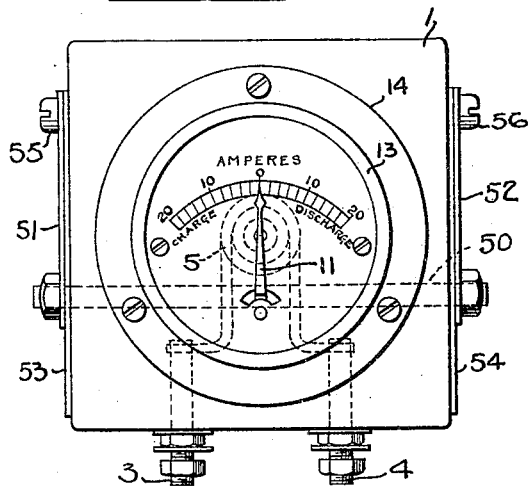
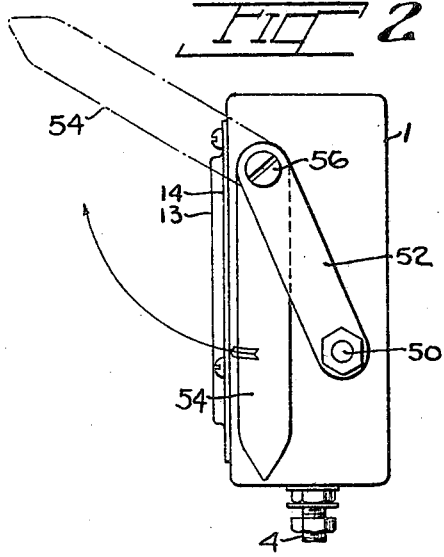
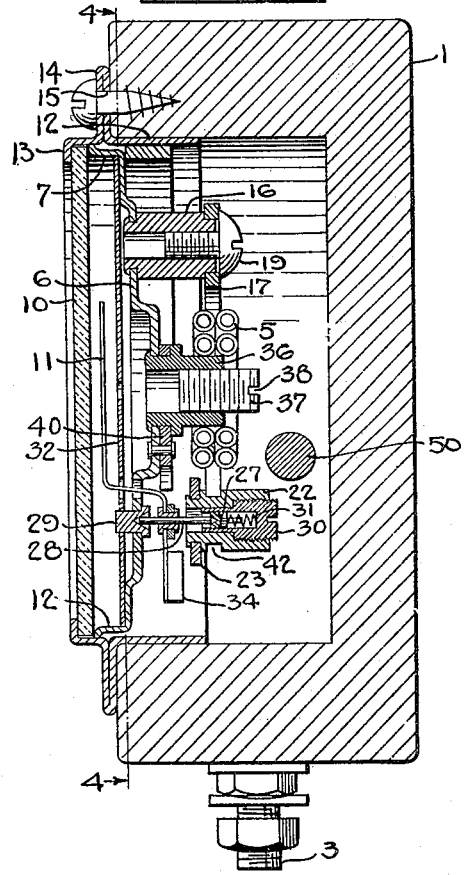
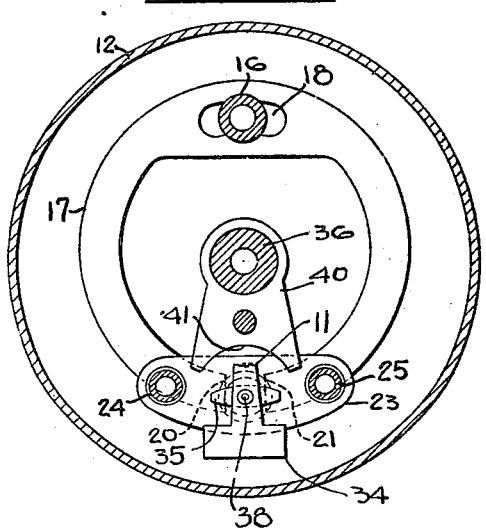
INVENTOR
Harry I. Shire
BY Thomas Howe
ATTORNEY

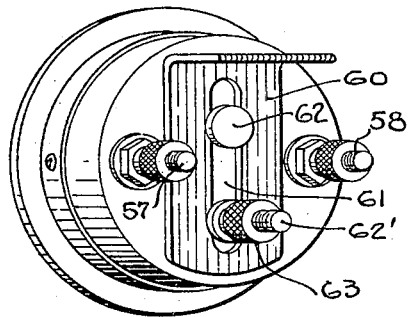
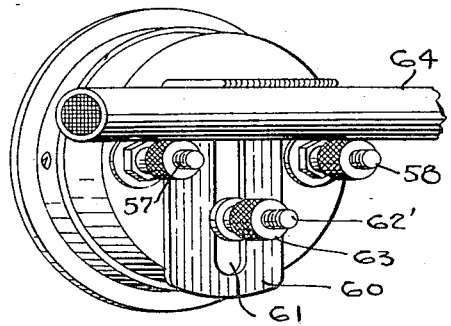
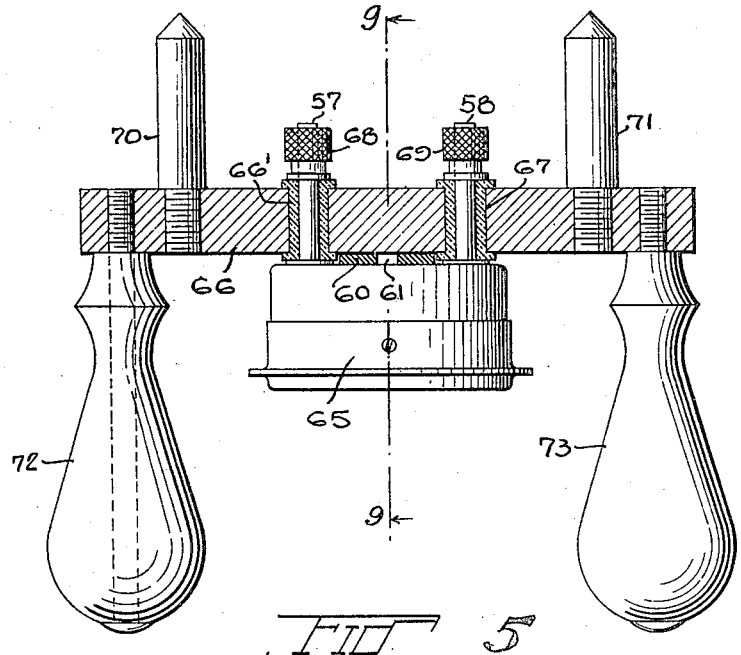
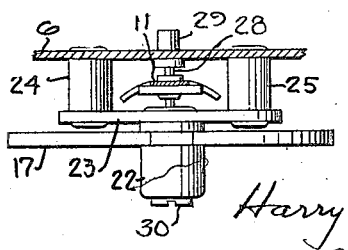

Dec. 25, 1928.                    1,696,333
H. I. SHIRE
ELECTRICAL INSTRUMENT
Original Filed Sept. 16, 1920    3 Sheets-Sheet 3
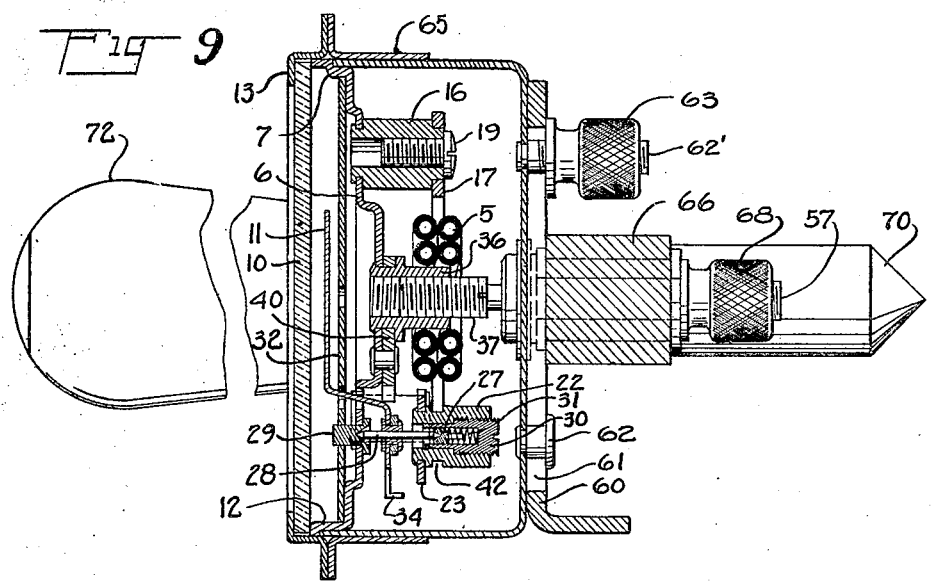
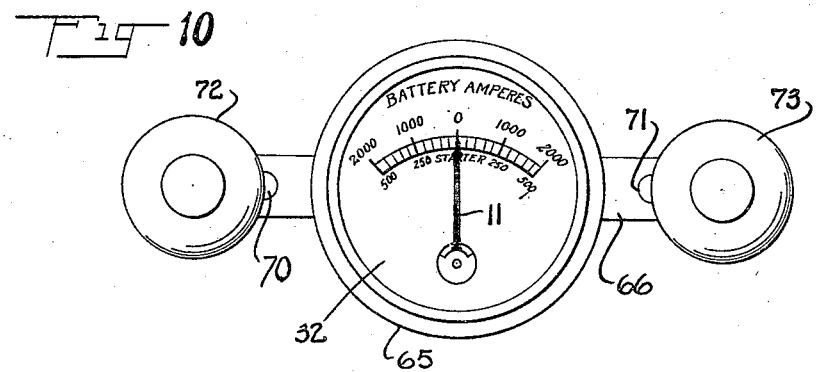

Patented Dec. 25, 1928.

1,696,333

UNITED STATES PATENT OFFICE.

HARRY I. SHIRE, OF DETROIT, MICHIGAN.

ELECTRICAL INSTRUMENT.

Application filed September 16, 1920, Serial No. 410,684. Renewed February 4, 1927.

This invention relates to devices for indicating electrical quantities. The instrument is especially useful for use in measuring or testing electrical conditions in connection with apparatus used on automobiles, but is capable of other uses.

The main object of the invention is to provide a short circuiting device and indicator whereby the conditon of charge of a battery may be tested.

A further object of the invention is to provide an instrument of simple construction and which shall be adapted to indicate small currents such as would be encountered in the testing of circuits carrying a small amount of current, say up to 20 amperes such as in testing dry cells, lamps, horns and the like, and at the same time shall be capable of use for testing storage batteries with currents say up to 2000 amperes.

A further object of the invention is to provide a simple and inexpensive structure whereby the current flowing in a wire may be ascertained without the necessity of connecting the instrument in conductive relation to the circuit so that opening of the circuit to insert the instrument is avoided.

A further object of the invention is to provide means whereby contact may be readily and firmly established between the terminals across which the instrument is placed, as for instance the terminals of a storage battery.

A further object of the invention is to provide means whereby a number of different current carrying elements acting in different degrees per unit of current upon the indicating elements are brought into definite positions of operative relation to said element whereby there are different ratios between movement of the indicating element and the current carried by the current carrying elements so that the same indicating element may be efficiently used for measuring widely varying currents by suitably selecting the current carrying element.

Other and ancillary objects of the invention will appear hereinafter.

In the accompanying drawings which illustrate the invention—

Fig. 1 is a front elevation of an instrument embodying the invention;

Fig. 2 is a side elevation of the same;

Fig. 3 is a central vertical section of the same on an enlarged scale;

Fig. 4 is a section (with the outer casing removed) on the line 4—4 of Fig. 3;

Fig. 5 is a fragmentary view showing in side elevation the ends of the horseshoe magnets on the instrument and adjacent parts;

Fig. 6 is a perspective view of a modified form of instrument;

Fig. 7 is a similar view of the instrument of Fig. 6 but with a conductor, the current of which is to be measured, in position; and Fig. 8 is a view in side elevation of an instrument comprising a structure the same as shown in Figs. 6 and 7 in combination with a current carrying element and contacting device, the latter being shown in longitudinal section.

Fig. 9 is a section on the line 9—9 of Fig. 8.

Fig. 10 is a front view of the indicating instrument of Fig. 8.

Referring to the drawings and first to Figs. 1 to 5 inclusive, a wooden casing 1 is provided in which are contained the actuating elements of the ammeter as shown. The actuating mechanism referred to is similar to that shown and described in my prior application Serial Number 333,515, filed October 27th, 1919, except for the straight bar for carrying large currents, and the arrangement of the central current coil whereby the terminals may be brought out at the bottom of the casing, as shown, instead of at the back as in my prior application referred to. The instrument here shown comprises terminals 3 and 4 mounted in the wooden casing so that they are insulated. The ends of an electric coil 5 having a plurality of turns are secured to the studs 3 and 4 respectively so the electrical connection with the coil may be made through the studs. The wire of the coil is insulated and it is of such size as to be self-sustaining so that the coil is supported from the studs.

A brass mechanism plate 6 has a flange 7 which bears against the glass plate 10 through which the indicator 11 is observed, this plate being held in position by means of a sleeve 12 sliding upon the inside of the casing 1 and having a flange 13 overlapping the front face of the glass plate for holding the latter in position, and also a flange 14 provided with bolt or screw holes 15 for securing the apparatus in the wooden casing.

Mounted upon a brass post 16 which is secured to the mechanism plate 6 is a permanent steel magnet 17 of the horse-shoe type. The upper end of the post 16 passes through a slot 18 of the magnet which is held in any position to which it may be adjusted by sliding it about the post 16, by means of a screw 19 tapped into the top of the post. The poles 20 and 21 of this magnet bear against a brass post 22 which is mounted in a plate 23 which in turn is mounted upon the posts 24 and 25 mounted in the mechanism plate 6. Sliding within the post 22 is a bearing 27 for the staff 28, while the other end of the staff engages with a bearing 29 secured in the mechanism plate 6. The bearing surfaces for the staff are of the usual conical type familiar in electrical meter and instrument structures.

The pressure upon the bearings may, however, be adjusted by means of the plug 30 screw-threaded into the top of the post 22, a spring 31 being interposed between the plug and the bearing 27, as shown. By screwing down on the plug and putting the spring under greater or less compression, the pressure between the bearings and the end of the spindle may be made any that is desired.

It has been found that the operation of the instrument, so far as being dead beat and firmly holding the rotatable element is concerned, is greatly improved by making the pressure upon the bearings greater than the weight of the staff and its carried parts. Fixed upon the staff so as to turn therewith is the pointer 11 moving over the dial plate 32 and having a counter-weight portion 34 which serves to balance the indicating end about the staff. Also fixed upon the staff is the armature 35 of magnetic material mounted below the gap between the poles of the permanent magnet so as to be acted on by the flux between the poles, whereby the magnet tends to set its length of greatest diameter across the gap as shown in Fig. 4.

The coil 5 has a magnetic core comprising a sleeve 36 of magnetic material in which is screw-threaded a member 37 of magnetic material whereby the magnetic circuit of the coil may be adjusted. The rear end of this member has a slot 38 for a screw driver. The core also comprises a member 40 of good magnetic material secured to the mechanism plate and in intimate magnetic relation to the sleeve 36. This member 40 terminates in a pole piece 41 in proximity to the armature 35.

The armature and consequently the pointer 11 will take up a position which will depend upon the resultant action of the magnetism of the coil 5 and of the flux of the permanent magnet. The relative effects of the two magnetisms upon the armature may be made to vary by screwing the member 37 back and forth thereby altering the magnetic circuit of the coil 5 and consequently its effect upon the armature. It is desirable, however, that the portions of the magnetic circuit adjacent the armature, namely the pole piece, shall be in permanent relationship to the axis of the armature so that any adjustment will not affect this relationship.

By the apparatus described, the instrument can be calibrated by varying the magnetic circuit of the coil 5 as described without disturbing the relationship of the armature to the immediately adjacent parts of the magnet core.

In order to bring the needle into registry with any particular part of the dial as for instance on zero, it may be desirable to shift the angular direction of the magnetism acting upon the armature but without changing it bodily. This can be effected with the apparatus shown by loosening the screw 19 and sliding the magnet at that point in one direction or the other when the magnet will turn about the post 22, that is about the axis of the staff, the ends or poles of the permanent magnet being entered within the circumferential groove 42 in the post 22 and bearing against the post at the base of the groove so as to turn thereon.

It is desired, however, that the cross-section of the permanent magnet shall not be decreased by reason of the slot 18 being in it and it is accordingly thickened at this point so as to have a uniform cross-section throughout of magnetic material.

With the coil 5 having a plurality of turns as indicated, the magneto-motive-force exerted upon the magnetic circuit of the instrument will be proportional to the current flowing multiplied by the number of turns of the coil. A relatively small current therefore such as would ordinarily be found in the circuits of dry cells, lamps, horns and the generator circuits of automobiles, can be made to have sufficient magneto-motive-force to afford extensive and therefore accurately observable indications. For ordinary purposes this would be from zero to 20 amperes as shown on the dial in Fig. 1 of the drawing, the instrument operating in either direction from a central zero position so that when connected in the storage battery circuit charging or discharging current may be indicated.

When it is desired to test the storage batteries observation is made of the current which will flow on a short circuit. Accordingly the present instrument is adapted for such use by mounting a single straight conducting bar 50 in the wooden casing. The ends of the bar where they emerge from the sides of the wooden casing are secured in electrical contact with strips 51 and 52 which are respectively connected with stiff pointed contacts or prods 53 and 54 which are pivoted upon the screws 55 and 56 which secure them to the casing and in electrical contact with the strips 51 and 52. These contacts may be folded into position against the sides of the casing as indicated by full lines in Fig. 2 or may be extended by turning them about their pivotal points into the positions as indicated by dotted lines in that figure when they are in position for use. These stiff prods may be pushed forcibly against the leaden terminals of storage batteries so that good contact therewith is made, the prods 53 and 54 being of material such as copper which is harder than lead and they are sharpened at their outer extremities as shown so as to easily indent and contact with the leaden terminals.

The bar 50 is substantially parallel to the plane of the coil 5 so that lines of force set up by the current in it are substantially parallel to the lines of force set up by the coil 5 and so follow the path wherein the movable element of the indicator is acted upon as set forth in the foregoing description. Also it is to be observed that the conductor 50 is substantially perpendicular to a plane passed through the center of the coil 5 and the axis of the movable element of the meter and intersects that plane at a point between the axes of the coil and movable element. The conductor 50 operates as a single turn and is not so closely associated with the magnetic circuit of the movable element as is the coil 5. Consequently a given amount of current in the conductor 50 has less effect upon the movable element. Ordinarily in testing a battery the meter should have a capacity up to 2000 amperes. The desired movement of the movable element with relation to the current flowing in the conductor 50 may be accomplished by mounting that conductor in closer or more remote association with the magnetic circuit of the movable element.

It thus appears that the instrument may be connected in circuit by means of its terminals 3 and 4 when current will flow through the coil 5 and the instrument will be a high reading one for use in indicating small currents. When, however, it is desired to have the instrument low reading for measuring heavy currents, connection is made to the terminals of the bar 50, the terminals 3 and 4 being disconnected. The connection of the bar 50 may be by means of pressing prods or other suitable connectors against the terminals between which it is desired to measure current, or connection with the ends of the bar might be made in any suitable way so as to place the bar in the circuit where it is desired to measure the current. In the instance shown the bar 50 is so related to the mechanism of the instrument that the needle will move but one-hundredth as far per unit of current as it will when actuated by the coil 5. The scale shown therefore reads directly for indicating current through the coil 5 but the readings are to be multiplied by one hundred when current through the conductor 50 is being indicated, the instrument having in the one case a capacity of 20 amperes and in the other case a capacity of 2000 amperes.

Referring now to Figs. 6 and 7, the instrument is the same as that shown and described in connection with Figs. 1 to 5 inclusive except that it has a metal case and the conductor 50 and its connections are omitted, and further that the terminals 57 and 58 of the coil 5 are brought out at the back of the casing similar to the terminals of the instrument in my prior application referred to, instead of at the bottom of the casing as in the apparatus of Figs. 1 to 5 hereof.

The instrument of Figs. 6 and 7 is provided with a clamp 60 having a slot 61 through which projects a pin having a head 62 beneath which the clamp may slide. Also projecting through the slot from the back of the instrument casing is a screw-threaded stud 62′ upon which is the thumb-nut 63 which may be screwed down against the clamp 60 to secure it in position.

The conductor as 64, in which it is desired to measure the current, is placed against the terminals or studs 57 and 58, the clamp pressed against it and then secured in this position by screwing up the nut 63, the conductor being thus clamped between the clamp and the studs 57 and 58. The studs 57 and 58 being upon substantially a diameter of the coil 5, it will be seen that the conductor 64 is located at one side of the horizontal diameter of the coil 5 and, being outside the casing and also removed from the magnetic members of the instrument to a greater distance than the coil 5, a given amount of current in the conductor 64 has less effect upon the indicator. The indicator therefore is lower reading for current in the conductor 64 than for current in the coil 5. In connection with automobiles the instrument as shown in Figs. 6 and 7 would most likely be used in testing the starting circuit of the automobile and the like and for this purpose the instrument should have a capacity up to 500 amperes. The adjustment of the conductor 64 with relation to the magnetic circuit of the instrument is therefore such that the effect on the current in the conductor 64 in shifting the field of the terminal magnet will be one-twenty-fifth of the effect produced by the same amount of current if flowing in the coil 5 so that the reading on the instrument per unit of current flowing in the straight conductor will be one-fifth that produced by the coil. Accordingly the reading on the scale of the instrument shown should be multiplied by twenty-five when the straight conductor is the current carrying element.

When desired the clamp may be released and the instrument and conductor 64 separated. The instrument may then be connected in any desired circuit by means of its terminals 57 and 58.

Referring now to Fig. 8 of the drawing, the device therein shown comprises an instrument 65, the same as that of Figs. 6 and 7. The clamp may or may not be removed as desired. The instrument is secured to a conducting bar 66 by having its coil terminals 57 and 58 passed through insulating bushings 66' and 67 in the bar and secured by the thumb nuts 68 and 69 as shown. Upon the opposite side of the bar from the instrument are pointed studs 70 and 71 which may be thrust and held against the points (as the leaden terminals of a storage battery) between which the current flow is desired. Upon the same side of the bar as the instrument project two handles 72 and 73 which are of aid in firmly holding the contacts against the terminals, one being taken in each hand.

The bar 66 should have very low resistance for making the short circuit test on batteries. In most cases satisfactory results will be obtained if the bar resistance from contact point to contact point is approximately one twentieth of the internal resistance of the battery with which it is to be employed. By keeping the bar resistance low compared with the internal resistance of the battery, changes in ampere values are substantially a direct indication of changes in internal resistance of the battery and the temperature coefficient of the metal forming the contacts and bar will have practically no influence on the current flow. Also as the resistance of the contacts and bar is reduced further and further below the internal resistance of the battery, the loss of energy external to the battery is reduced and as it becomes very low substantially all of the energy dissipated by the short circuit current will be that due to the internal resistance of the battery. For use in a short circuit test as described, the instrument should ordinarily read up to two thousand amperes and so the bar 66 should be so related to the instrument that a given current in the bar will only have the effect of deflecting the movable element one one-hundredth as much as if the same current traversed the coil connected to the terminals 57 and 58 so that the scale readings should be multiplied by one hundred. This has been fully elucidated in connection with the devices of the preceding figures.

It will be observed that when the contacts 70 and 71 are pressed against the battery terminals a closed loop will be formed through the bar 66 and the meter should be on the outside of the bar so as to be outside of the loop. Otherwise the meter will not give accurate readings unless it is held perfectly vertical, deviation from this position resulting in changes in readings. With the instrument outside of the loop, however, it is not necessary to be so careful in positioning the instrument. The instrument may be caused to be outside the loop by mounting it on the opposite side of the bar 66 from the contacts 70 and 71 as shown.

While the invention has been illustrated in what are considered its best applications, it may have other embodiments without departing from its spirit and is not, therefore, limited to the structure shown in the drawings.

What I claim is:

1. The combination with a permanent magnet, of a pivoted armature affected by the magnetism from said magnet, a coil having a plurality of turns and adapted to modify the effect of said permanent magnet upon said armature, a pointer actuated by said armature and a substantially straight conductor adapted to modify the effect of said permanent magnet on said armature according to the current in said conductor, said coil and conductor being placed in predetermined relationship to said armature, and a scale adapted to indicate the currents in said coil and conductor respectively when in such predetermined relationship.

2. The combination with a permanent magnet, of a pivoted armature affected by the magnetism from said magnet, a pointer actuated by said armature, a coil having a plurality of turns adapted to magnetically affect said armature, a casing for the instrument, terminals for said coil upon the exterior of the instrument and means for securing a conductor in position upon the exterior of the instrument to produce a magnetic effect upon said armature according to the current in said conductor.

3. As an article of manufacture, the combination with an electrically conducting bar adapted to be placed in operative relation to an electrical indicating instrument, of an electrical indicating instrument, said bar having insulated openings for receiving terminals of the said instrument.

4. The combination with an electrically conducting bar adapted to be placed in inductive relation to an electrical indicating instrument, of contacting members in conducting relation to said bar on one side and an electrical indicating instrument upon the other side of said bar, the indicating relationship of said instrument and bar being effected by magnetic induction from said bar when it is carrying current.

5. The combination with an electrically conducting bar, of contact points in electrical connection therewith, an indicating instrument upon the opposite side of said bar from said contact points, said indicating instrument comprising a coil and a movable member acted upon by said coil, said instrument also comprising terminals for said coil and said bar having insulated openings for receiving said terminals.

6. In an electrical indicating apparatus, the combination with indicating means affected by current in near conductors, of means for locating conductors in a plurality of predetermined positions with relation to said indicating means whereby the currents in said conductors have different effects upon said indicating means, and a scale adapted to indicate the current in said conductors respectively when placed in said predetermined positions.

7. In electrical testing apparatus, the combination of ampere indicating means, a straight conductor in operative relation to said indicating means adapted to be connected across the terminals of a device to be tested and means for locating another conductor in a different relation to said indicating means, and a scale adapted to indicate the current in said conductors respectively when placed in predetermined positions.

8. An electrical testing apparatus for testing a storage battery and indicating the current flowing in a conductor of a starter circuit, comprising in combination an electrical indicating instrument, a conductor adapted to be connected across the terminals of the storage battery, and in inductive relation to said instrument, said instrument having one calibration adapted to indicate the current flowing in said conductor and another calibration for indicating the current flowing in a conductor placed in a predetermined relation to said instrument different from the position of the aforesaid conductor.

9. An electrical indicating instrument comprising in combination a casing, an indicating face at the front of the casing, said casing having a back substantially parallel to said face, operating mechanism between said face and back adapted to be affected inductively by a conductor located at said back, said mechanism comprising a coil, terminals electrically connecting with said coil and projecting from said back, said instrument being calibrated to indicate the current in a conductor placed against said terminals, and acting inductively upon said mechanism.

10. In an electrical testing device, a pair of contact making projections, an exposed conductor connected between said projections, and an indicating instrument having a movable element affected by the magnetic field created by a current passing through said conductor.

11. An electrical indicating instrument comprising in combination a casing, an indicating face at the front of the casing, said casing having a back substantially parallel to said face, operating mechanism between said face and back adapted to be affected inductively by a conductor located at said back and exterior to said casing, said instrument being calibrated to indicate the current in said conductor placed in a predetermined position at the back of the instrument, projections extending exteriorly from said casing constructed to cooperate with said conductor to properly relatively position said conductor and mechanism and contact making and breaking prods secured to said conductor.

In testimony whereof I have signed this specification this 21st day of August, 1920.

HARRY I. SHIRE.